United States Patent
Salter et al.

(10) Patent No.: US 9,587,800 B2
(45) Date of Patent: Mar. 7, 2017

(54) LUMINESCENT VEHICLE MOLDING

(71) Applicant: Ford Global Technologies, LLC, Dearborn, MI (US)

(72) Inventors: Stuart C. Salter, White Lake, MI (US); Michael James Whitens, Milford, MI (US); Cornel Lewis Gardner, Romulus, MI (US); Paul Kenneth Dellock, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/640,727

(22) Filed: Mar. 6, 2015

(65) Prior Publication Data

US 2015/0175060 A1 Jun. 25, 2015

Related U.S. Application Data

(63) Continuation-in-part of application No. 14/086,442, filed on Nov. 21, 2013.

(51) Int. Cl.
*B60Q 1/32* (2006.01)
*F21V 9/16* (2006.01)
*F21S 8/10* (2006.01)

(52) U.S. Cl.
CPC .......... *F21V 9/16* (2013.01); *B60Q 1/32* (2013.01); *F21S 48/214* (2013.01)

(58) Field of Classification Search
CPC ... B60Q 1/323; B60Q 1/32; F21V 9/16; F21S 48/214; B60R 1/002
See application file for complete search history.

(56) References Cited

U.S. PATENT DOCUMENTS

| | | | |
|---|---|---|---|
| 5,709,453 A * | 1/1998 | Krent | B60Q 1/0011 362/100 |
| 6,031,511 A | 2/2000 | DeLuca et al. | |
| 6,072,391 A * | 6/2000 | Suzuki | B60K 35/00 340/435 |
| 6,117,362 A | 9/2000 | Yen et al. | |
| 6,471,381 B2 | 10/2002 | Atkinson et al. | |
| 6,494,490 B1 | 12/2002 | Trantoul | |
| 6,577,073 B2 | 6/2003 | Shimizu et al. | |
| 6,729,738 B2 | 5/2004 | Fuwausa et al. | |
| 6,737,964 B2 | 5/2004 | Samman et al. | |
| 6,773,129 B2 | 8/2004 | Anderson, Jr. et al. | |
| 6,820,888 B1 | 11/2004 | Griffin | |

(Continued)

FOREIGN PATENT DOCUMENTS

CN 201169230 Y 12/2008
CN 101337492 A 1/2009

(Continued)

*Primary Examiner* — Anh Mai
*Assistant Examiner* — Fatima Farokhrooz
(74) *Attorney, Agent, or Firm* — Jason Rogers; Price Heneveld LLP

(57) ABSTRACT

A molding of a vehicle is provided herein. The molding includes a cover panel portion mounted to a body panel of the vehicle. A carrier is disposed between the cover panel portion and the body panel, the carrier having an exposed portion configured to luminesce in response to light excitation. At least one light source is disposed inside the carrier and is configured to emit light for exciting the exposed portion.

20 Claims, 4 Drawing Sheets

(56) References Cited

U.S. PATENT DOCUMENTS

| | | |
|---|---|---|
| 6,851,840 B2 | 2/2005 | Ramamurthy et al. |
| 6,859,148 B2 | 2/2005 | Miller |
| 6,871,986 B2 | 3/2005 | Yamanaka et al. |
| 6,953,536 B2 | 10/2005 | Yen et al. |
| 6,990,922 B2 | 1/2006 | Ichikawa et al. |
| 7,082,721 B2 | 8/2006 | Whitehead |
| 7,161,472 B2 | 1/2007 | Strumolo et al. |
| 7,213,923 B2 | 5/2007 | Liu et al. |
| 7,264,366 B2 | 9/2007 | Hulse |
| 7,264,367 B2 | 9/2007 | Hulse |
| 7,441,914 B2 | 10/2008 | Palmer et al. |
| 7,501,749 B2 | 3/2009 | Takeda et al. |
| 7,575,349 B2 | 8/2009 | Bucher et al. |
| 7,618,157 B1 | 11/2009 | Galvez et al. |
| 7,745,818 B2 | 6/2010 | Sofue et al. |
| 7,753,541 B2 | 7/2010 | Chen et al. |
| 7,834,548 B2 | 11/2010 | Jousse et al. |
| 7,862,220 B2 | 1/2011 | Cannon et al. |
| 7,987,030 B2 | 7/2011 | Flores et al. |
| 8,016,465 B2 | 9/2011 | Egerer et al. |
| 8,022,818 B2 | 9/2011 | la Tendresse et al. |
| 8,071,988 B2 | 12/2011 | Lee et al. |
| 8,097,843 B2 | 1/2012 | Agrawal et al. |
| 8,136,425 B2 | 3/2012 | Bostick |
| 8,163,201 B2 | 4/2012 | Agrawal et al. |
| 8,178,852 B2 | 5/2012 | Kingsley et al. |
| 8,197,105 B2 | 6/2012 | Yang |
| 8,203,260 B2 | 6/2012 | Li et al. |
| 8,207,511 B2 | 6/2012 | Bortz et al. |
| 8,232,533 B2 | 7/2012 | Kingsley et al. |
| 8,247,761 B1 | 8/2012 | Agrawal et al. |
| 8,286,378 B2 | 10/2012 | Martin et al. |
| 8,408,766 B2 | 4/2013 | Wilson et al. |
| 8,415,642 B2 | 4/2013 | Kingsley et al. |
| 8,421,811 B2 | 4/2013 | Odland et al. |
| 8,466,438 B2 | 6/2013 | Lambert et al. |
| 8,519,359 B2 | 8/2013 | Kingsley et al. |
| 8,519,362 B2 | 8/2013 | Labrot et al. |
| 8,552,848 B2 | 10/2013 | Rao et al. |
| 8,606,430 B2 | 12/2013 | Seder et al. |
| 8,624,716 B2 | 1/2014 | Englander |
| 8,631,598 B2 | 1/2014 | Li et al. |
| 8,664,624 B2 | 3/2014 | Kingsley et al. |
| 8,683,722 B1 | 4/2014 | Cowan |
| 8,754,426 B2 | 6/2014 | Marx et al. |
| 8,773,012 B2 | 7/2014 | Ryu et al. |
| 8,846,184 B2 | 9/2014 | Agrawal et al. |
| 8,876,352 B2 | 11/2014 | Robbins et al. |
| 8,952,341 B2 | 2/2015 | Kingsley et al. |
| 9,006,751 B2 | 4/2015 | Kleo et al. |
| 9,057,021 B2 | 6/2015 | Kingsley et al. |
| 9,065,447 B2 | 6/2015 | Buttolo et al. |
| 9,187,034 B2 | 11/2015 | Tarahomi et al. |
| 9,299,887 B2 | 3/2016 | Lowenthal et al. |
| 2002/0159741 A1* | 10/2002 | Graves .............. B60Q 1/26 385/133 |
| 2002/0163792 A1 | 11/2002 | Formoso |
| 2003/0179548 A1 | 9/2003 | Becker et al. |
| 2004/0213088 A1 | 10/2004 | Fuwausa |
| 2005/0048263 A1 | 3/2005 | Ford et al. |
| 2006/0087826 A1 | 4/2006 | Anderson, Jr. |
| 2006/0097121 A1 | 5/2006 | Fugate |
| 2007/0032319 A1* | 2/2007 | Tufte .............. G09F 13/22 473/570 |
| 2007/0285938 A1 | 12/2007 | Palmer et al. |
| 2009/0115631 A1* | 5/2009 | Foote ............... B60Q 1/2665 340/901 |
| 2009/0219730 A1 | 9/2009 | Syfert et al. |
| 2009/0251920 A1 | 10/2009 | Kino et al. |
| 2009/0260562 A1 | 10/2009 | Folstad et al. |
| 2009/0262515 A1 | 10/2009 | Lee et al. |
| 2011/0012062 A1 | 1/2011 | Agrawal et al. |
| 2012/0001406 A1 | 1/2012 | Paxton et al. |
| 2012/0104954 A1 | 5/2012 | Huang |
| 2012/0183677 A1 | 7/2012 | Agrawal et al. |
| 2012/0228448 A1 | 9/2012 | Jabra |
| 2012/0280528 A1* | 11/2012 | Dellock ............ B60R 1/06 296/1.08 |
| 2013/0335994 A1 | 12/2013 | Mulder et al. |
| 2014/0065442 A1 | 3/2014 | Kingsley et al. |
| 2014/0077525 A1* | 3/2014 | Yoshimura ......... B62D 35/007 296/180.1 |
| 2014/0103258 A1 | 4/2014 | Agrawal et al. |
| 2014/0264396 A1 | 9/2014 | Lowenthal et al. |
| 2014/0266666 A1 | 9/2014 | Habibi |
| 2014/0373898 A1 | 12/2014 | Rogers et al. |
| 2015/0046027 A1 | 2/2015 | Sura et al. |
| 2015/0138789 A1 | 5/2015 | Singer et al. |
| 2015/0267881 A1 | 9/2015 | Salter et al. |
| 2016/0016506 A1 | 1/2016 | Collins et al. |

FOREIGN PATENT DOCUMENTS

| | | |
|---|---|---|
| CN | 201193011 Y | 2/2009 |
| DE | 29708699 U1 | 7/1997 |
| DE | 10319396 A1 | 11/2004 |
| DE | 102007060159 A1 | 6/2009 |
| DE | 102009042112 A1 | 3/2011 |
| DE | 102011106318 A1 | 1/2013 |
| DE | 102012017281 A1 | 3/2013 |
| DE | 102011119102 A1 | 5/2013 |
| EP | 1793261 A1 | 6/2007 |
| EP | 2556996 A2 | 2/2013 |
| EP | 2778209 A1 | 9/2014 |
| JP | 2000159011 A | 6/2000 |
| JP | 2007210541 A | 8/2007 |
| JP | 2007238063 A | 9/2007 |
| WO | 2006047306 A1 | 5/2006 |
| WO | 2014068440 A1 | 5/2014 |

* cited by examiner

LUMINESCENT VEHICLE MOLDING

CROSS-REFERENCE TO RELATED APPLICATION

This application is a continuation-in-part of U.S. patent application Ser. No. 14/086,442, filed Nov. 21, 2013, and entitled "VEHICLE LIGHTING SYSTEM WITH PHOTOLUMINESCENT STRUCTURE," the entire disclosure of which is hereby incorporated herein by reference.

FIELD OF THE INVENTION

The present disclosure generally relates to vehicle lighting systems, and more particularly, to vehicle lighting systems employing one or more photoluminescent structures.

BACKGROUND OF THE INVENTION

Illumination arising from the use of photoluminescent structures offers a unique and attractive viewing experience. It is therefore desired to implement such structures in automotive vehicles for various lighting applications.

SUMMARY OF THE INVENTION

According to one aspect of the present invention, a molding of a vehicle is provided. The molding includes a cover panel portion mounted to a body panel of the vehicle. A carrier is disposed between the cover panel portion and the body panel, the carrier having an exposed portion configured to luminesce in response to light excitation. At least one light source is disposed inside the carrier and is configured to emit light for exciting the exposed portion.

According to another aspect of the present invention, a molding of a vehicle is provided. The molding includes a cover panel portion partially covering a body panel of the vehicle. A carrier is disposed between the cover panel portion and the body panel, the carrier having an exposed portion configured to luminesce in response to light excitation. At least one light source is configured to emit light for exciting the exposed portion and is disposed on a flex circuit snapably engaged to the carrier.

According to yet another aspect of the present invention, a molding of a vehicle is provided. The molding includes a cover panel portion partially covering a body panel of the vehicle. A carrier is injection molded to the cover panel portion and disposed between the cover panel portion and the body panel, the carrier having an exposed portion configured to luminesce in response to light excitation. At least one light source is configured to emit light for exciting the exposed portion and is disposed on a flex circuit snapably engaged to the carrier.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes a vehicle lighting system that advantageously employs one or more photoluminescent structures configured to convert light received from an associated light source and re-emit the light at a different wavelength.

Figure 1A:
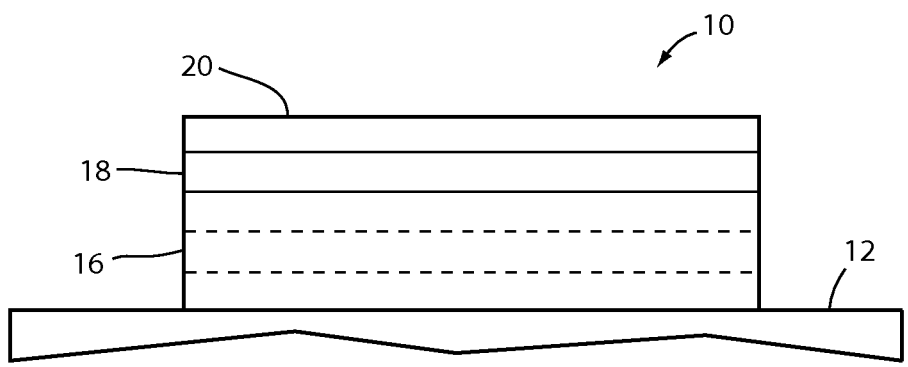
FIG. 1A illustrates a photoluminescent structure coupled to a substrate, according to one embodiment.
Figure 1B:
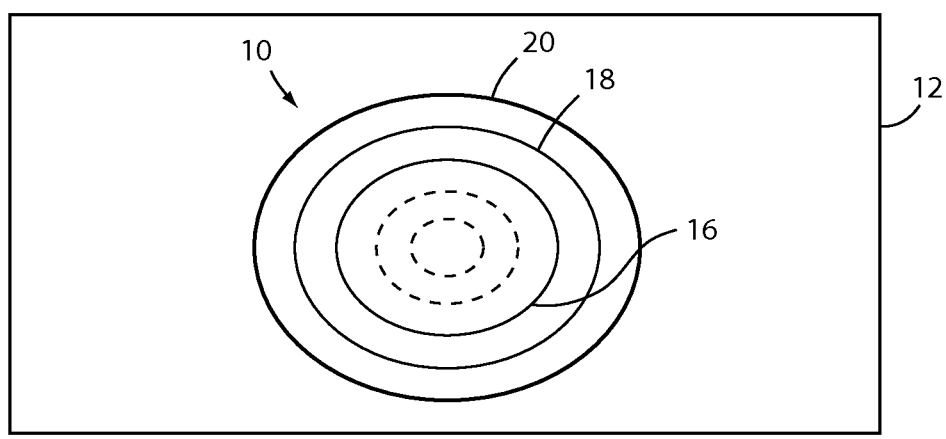
FIG. 1B illustrates a photoluminescent structure coupled to a substrate, according to another embodiment.
Figure 1C:
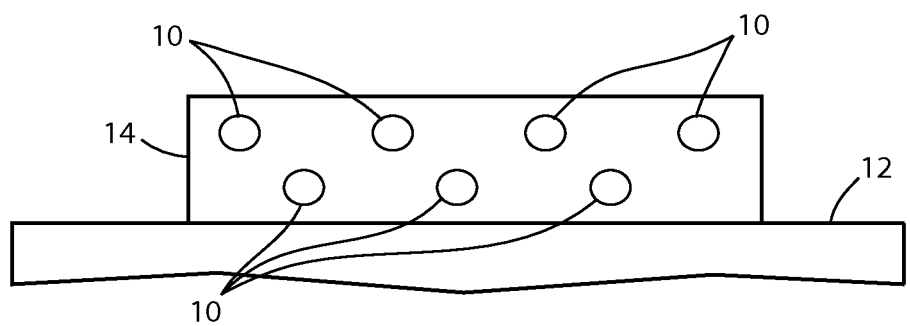
FIG. 1C illustrates a photoluminescent structure coupled to a substrate, according to yet another embodiment.

Referring to FIGS. 1A-1C, various exemplary embodiments of a photoluminescent structure 10 are shown, each capable of being coupled to a substrate 12, which may correspond to a vehicle fixture or vehicle related piece of equipment. In FIG. 1A, the photoluminescent structure 10 is generally shown rendered as a coating (e.g. a film) that may be applied to a surface of the substrate 12. In FIG. 1B, the photoluminescent structure 10 is generally shown as a discrete particle capable of being integrated with a substrate 12. In FIG. 1C, the photoluminescent structure 10 is generally shown as a plurality of discrete particles that may be incorporated into a support medium 14 (e.g. a film) that may then be applied (as shown) or integrated with the substrate 12.

At the most basic level, a given photoluminescent structure 10 includes an energy conversion layer 16 that may include one or more sub layers, which are exemplarily shown through broken lines in FIGS. 1A and 1B. Each sub layer of the energy conversion layer 16 may include one or more photoluminescent materials having energy converting elements with phosphorescent or fluorescent properties. Each photoluminescent material may become excited upon receiving light of a specific wavelength, thereby causing the light to undergo a conversion process. Under the principle of down conversion, the inputted light is converted into a longer wavelength light that is outputted from the photoluminescent structure 10. Conversely, under the principle of up conversion, the inputted light is converted into a shorter wavelength light that is outputted from the photoluminescent structure 10. When multiple distinct wavelengths of light are outputted from the photoluminescent structure 10 at the same time, the wavelengths of light may mix together and be expressed as a multicolor light.

In some embodiments, light that has been down converted or up converted may be used to excite other photoluminescent material(s) found in the energy conversion layer 16. The process of using converted light outputted from one photoluminescent material to excite another, and so on, is generally known as an energy cascade and may serve as an alternative for achieving various color expressions. With respect to either conversion principle, the difference in wavelength between the exciting light and the converted light is known as the Stokes shift and serves as the principle driving mechanism for an energy conversion process corresponding to a change in wavelength of light. In the various implementations discussed herein, each of the photoluminescent structures may operate under either conversion principle.

The energy conversion layer 16 may be prepared by dispersing the photoluminescent material in a polymer matrix to form a homogenous mixture using a variety of methods. Such methods may include preparing the energy conversion layer 16 from a formulation in a liquid carrier medium and coating the energy conversion layer 16 to a desired substrate. The energy conversion layer 16 may be applied to a substrate by painting, screen printing, spraying, slot coating, dip coating, roller coating, and bar coating. Alternatively, the energy conversion layer 16 may be prepared by methods that do not use a liquid carrier medium. For example, the energy conversion layer 16 may be rendered by dispersing the photoluminescent material into a solid state solution (homogenous mixture in a dry state) that may be incorporated in a polymer matrix, which may be formed by extrusion, injection molding, compression molding, calendaring, thermoforming, etc. The energy conversion layer 16 may then be integrated into a substrate using any methods known to those skilled in the art. When the energy conversion layer 16 includes sub layers, each sub layer may be sequentially coated to form the energy conversion layer 16. Alternatively, the sub layers can be separately prepared and later laminated or embossed together to form the energy conversion layer 16. Alternatively still, the energy conversion layer 16 may be formed by coextruding the sub layers.

Referring back to FIGS. 1A and 1B, the photoluminescent structure 10 may optionally include at least one stability layer 18 to protect the photoluminescent material contained within the energy conversion layer 16 from photolytic and thermal degradation. The stability layer 18 may be configured as a separate layer optically coupled and adhered to the energy conversion layer 16. Alternatively, the stability layer 18 may be integrated with the energy conversion layer 16. The photoluminescent structure 10 may also optionally include a protection layer 20 optically coupled and adhered to the stability layer 18 or other layer (e.g. the conversion layer 16 in the absence of the stability layer 18) to protect the photoluminescent structure 10 from physical and chemical damage arising from environmental exposure. The stability layer 18 and/or the protective layer 20 may be combined with the energy conversion layer 16 through sequential coating or printing of each layer, sequential lamination or embossing, or any other suitable means.

Additional information regarding the construction of photoluminescent structures is disclosed in U.S. Pat. No. 8,232, 533 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," filed Jul. 31, 2012, the entire disclosure of which is incorporated herein by reference. For additional information regarding fabrication and utilization of photoluminescent materials to achieve various light emissions, refer to U.S. Pat. No. 8,207,511 to Bortz et al., entitled "PHOTOLUMINESCENT FIBERS, COMPOSITIONS AND FABRICS MADE THEREFROM," filed Jun. 26, 2012; U.S. Pat. No. 8,247,761 to Agrawal et al., entitled "PHOTOLUMINESCENT MARKINGS WITH FUNCTIONAL OVERLAYERS," filed Aug. 21, 2012; U.S. Pat. No. 8,519,359 B2 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," filed Aug. 27, 2013; U.S. Pat. No. 8,664,624 B2 to Kingsley et al., entitled "ILLUMINATION DELIVERY SYSTEM FOR GENERATING SUSTAINED SECONDARY EMISSION," filed Mar. 4, 2014; U.S. Patent Publication No. 2012/0183677 to Agrawal et al., entitled "PHOTOLUMINESCENT COMPOSITIONS, METHODS OF MANUFACTURE AND NOVEL USES," filed Jul. 19, 2012; U.S. Patent Publication No. 2014/0065442 A1 to Kingsley et al., entitled "PHOTOLUMINESCENT OBJECTS," filed Mar. 6, 2014; and U.S. Patent Publication No. 2014/0103258 A1 to Agrawal et al., entitled "CHROMIC LUMINESCENT COMPOSITIONS AND TEXTILES," filed Apr. 17, 2014, all of which are included herein by reference in their entirety.

Figure 2:
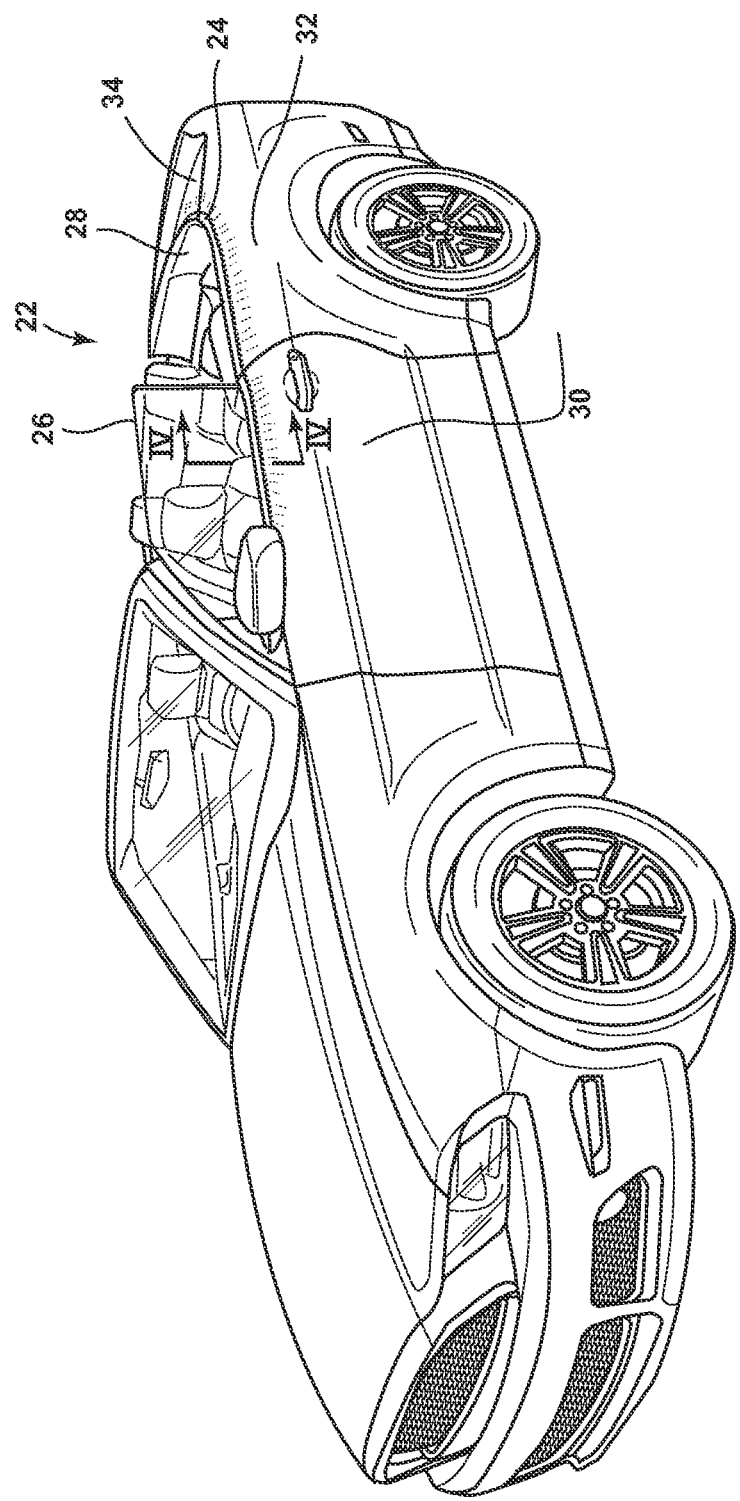
FIG. 2 illustrates a vehicle having molding configured to luminesce, according to one embodiment.
Figure 3:
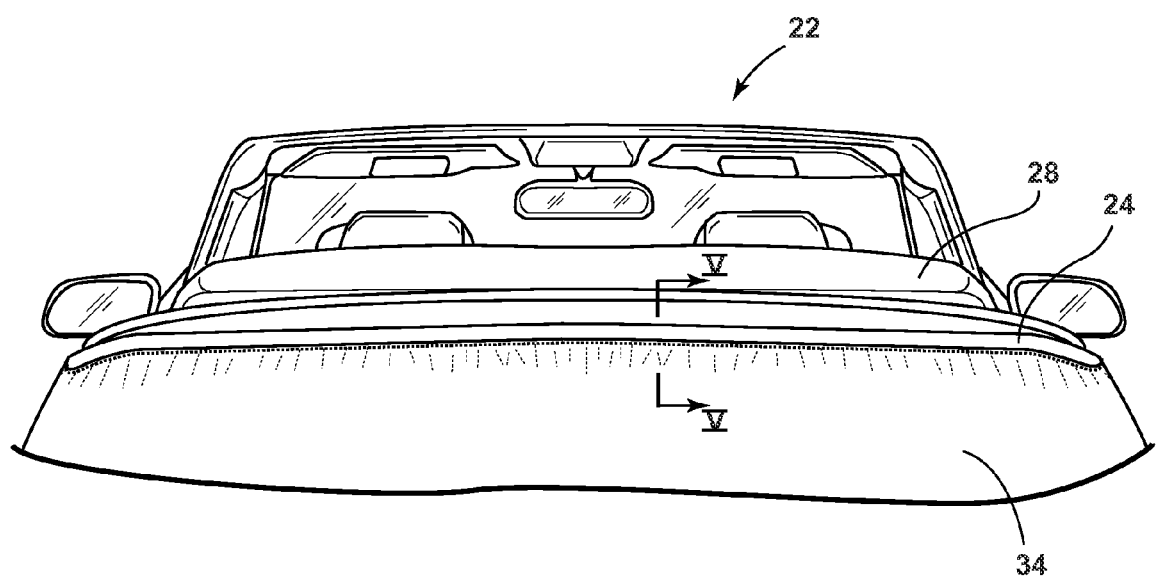
FIG. 3 is a rear view of a vehicle having molding configured to luminesce, according to one embodiment.

Referring to FIGS. 2 and 3, one embodiment of a vehicle 22 is shown having protective molding 24 that extends longitudinally along the belt line of the vehicle 22. As used herein, the belt line generally refers to the line along the sides and rear of the vehicle 22 just below the side window 26 and the retractable top 28. Molding 24 located along the belt line may be sectioned and coupled to the body panel of the vehicle 22, including side panel 30, rear panel 32, and trunk panel 34. As shown and described in greater detail below, the molding 24 is configured to provide decorative and/or functional lighting. While a convertible vehicle 22 is shown in FIGS. 2 and 3, it should be appreciated that the molding 24 described herein may be similarly fashioned along the belt line of non-convertible vehicle such as, but not limited to, coupes, sedans, trucks, sport utility, vans, and the like. Further, it should be appreciated that protective moldings found elsewhere on the vehicle 22 may also be manufactured in accordance with the principles of the present invention.

Figure 4:
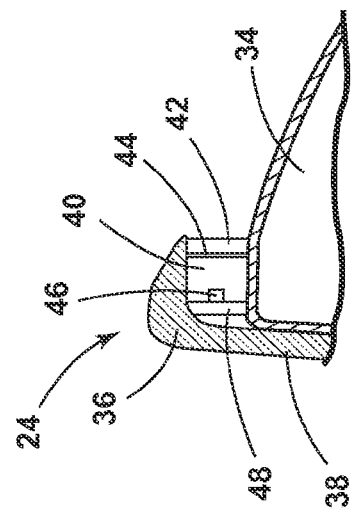
FIG. 4 is a cross-sectional view of a side vehicle molding, according to one embodiment.
Figure 5:
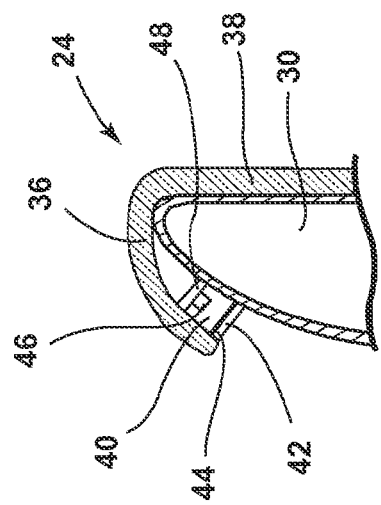
FIG. 5 is a cross-sectional view of a rear vehicle molding, according to one embodiment.

Referring to FIGS. 4 and 5, a cross sectional view of the molding 24 is shown according to one embodiment. The molding 24 includes a cover panel member 36 mounted to a body panel (e.g., side panel 30 and trunk panel 34) of the vehicle 22 and a mounting member 38 that may be secured to the body panel by any conventional means. The cover panel member 36 may be constructed from a flexible, resilient material, such as an elastomer, and includes a distal end 40 configured to engage a carrier 40 such that the carrier 40 is disposed between the cover panel member 36 and the body panel. The carrier 40 may be arranged as an optical waveguide extending substantially the length of the molding 24 and may be injection molded (e.g., two shot molded) to the molding 24, thereby enabling the carrier 40 to be integrated with the molding 24 at a relatively low cost.

The front of the carrier 40 includes an exposed portion 42 configured to luminesce in response to light excitation. The exposed portion 42 may be arranged as a strip or in segments and includes a photoluminescent structure 44 applied or otherwise arranged thereon or interspersed therein. The exposed portion 42 is oriented relative to the body panel to ensure that it can be viewed by persons located outside the vehicle 22. One or more light sources 46 are disposed inside the carrier 40 and are configured to emit light for exciting the exposed portion 42. More specifically, light emitted from the light source 46 that reaches the exposed portion 42 is converted by the photoluminescent structure 44 and re-emitted as light having a different wavelength, typically in the visible spectrum. The light source 46 may be disposed on a flexible circuit board 48 (e.g., a copper flexible circuit) that is coupled to the rear of the carrier 40. In such an arrangement, the flexible circuit board 48 may flex in conjunction with the cover panel member 36 to allow the molding 24 to be contoured to the body panel.

Figure 6:
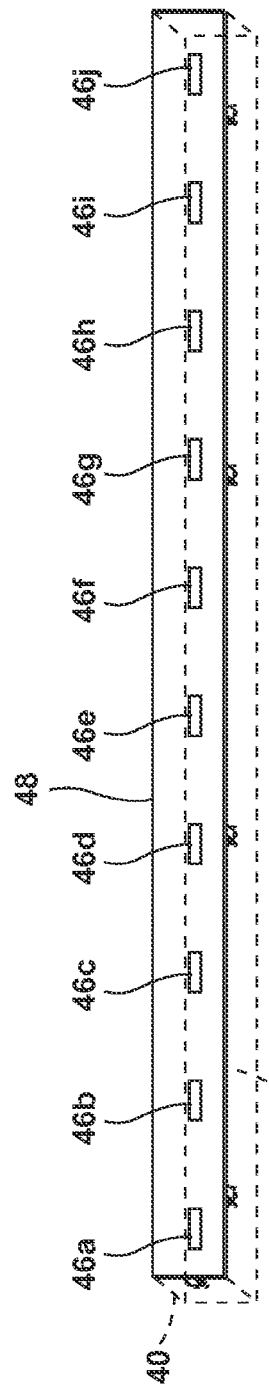
FIG. 6 illustrates a plurality of light sources disposed on a flexible circuit board that is snapably engaged to a carrier.

Referring to FIG. 6, a plurality of light sources 46a-j are disposed on the flexible circuit board 48. The flexible circuit board 48 is snapably engaged or otherwise secured to the carrier 40. The light sources 46a-j may be powered by a vehicle power supply (e.g., a vehicle battery) and are each configured to emit non-focused light toward a section of the exposed portion 42 located in front thereof. The light sources 46a-j may be spaced such that light is distributed across the substantial entirety of the exposed portion 42 when the light sources 46a-j are simultaneously activated such that uniform excitation is provided to the exposed portion 42. Additionally, the non-exposed walls of the carrier 40 and the surface of the flexible circuit board 48 facing the exposed portion 42 may be configured to internally reflect light within the carrier 40, thereby optimizing excitation, and in turn, the perceived luminescence of the exposed portion 42.

In operation, each light source 46a-j may be controlled by an electronic control module of the vehicle 22 (e.g., a body control module) and selectively activated, either automatically or manually. According to one embodiment, the light sources 46a-j may be activated at varying intensity (e.g., by pulse-width modulation or direct current control) to dictate the degree of brightness in which the exposed portion 42 luminesces. For example, the light sources 46a-j may be activated in unison to emit light at a lower intensity when the vehicle 22 is idle or in drive and at a higher intensity when the vehicle brakes are applied. The light sources 46a-j may continue to emit light at the higher intensity so long as the brakes are applied, resulting in the exposed portion 42 luminescing at a higher brightness relative to when the light sources 46a-j are activated at the lower intensity. The carrier 40 and flexible circuit board 48 ensemble may be coupled to a molding 24 located to the rear of the vehicle 22, such as that shown in FIG. 2. Further, the light sources 46a-j may be configured as blue LEDs and the exposed portion 42 may be configured to luminesce in a red color in response to excitation by blue light. In this manner, the molding 24 may function as a brake light consistent with pre-existing brake lights such as taillights and center high mount stop lamps (CHMSL).

According to another embodiment, the carrier 40 and flexible circuit board 48 may be coupled to an exterior door molding. When the door is opened, the light sources 46a-j may be simultaneously activated such that the exposed portion 42 luminesces (e.g., in a white color), thereby making the door more visible to oncoming vehicles.

According to another embodiment, the light sources 46a-j may be activated in unison to emit light intermittently such that the exposed portion 42 luminesces in a blinking pattern. Thus, if the carrier 40 and flexible circuit board 48 ensemble is coupled provided in moldings 24 located on the sides of the vehicle 22, the respective moldings 24 may function as turn signals. That is, the light sources 46a-j associated with the molding located on the left side of the vehicle 22 may be activated when a vehicle operator moves a turn signal lever to indicate a left turn such that the exposed portion 42 on the left side of the vehicle 22 luminesces in a similar blinking pattern as that of the left headlight and/or taillight. Likewise, the light sources 46a-j associated with the molding 24 on the right side of the vehicle 22 may be activated when the vehicle operator moves the turn signal lever to indicate a right turn such that the exposed portion 42 on the right of the vehicle 22 luminesces in a similar blinking pattern as that of the right headlight and/or taillight. Additionally, the light sources 46a-j on each side of the vehicle 22 may be activated together when the vehicle operator activates a hazard switch such that the exposed portions 42 on each side of the vehicle 22 luminesce in a similar blinking pattern as that of the hazard lights. With respect to the presently described embodiment, the exposed portions 42 may be configured to luminesce in a color that matches the beam color of the headlights of the vehicle 22, such as amber or white.

According to yet another embodiment, the light sources 46a-j may be activated to produce a variety of decorative effects. For example, the light sources 46a-j may be activated in succession, beginning with light source 46a, followed by light source 46b, light source 46c, and so on, and ending with light source 46j, thereby causing the exposed portion 42 to gradually luminesce in its entirety. Once light source 46j is activated, the light sources 46a-j may be deactivated to attenuate or eliminate altogether the luminescence of the exposed portion 42. Thereafter, the actuation sequence outlined above may be repeated once more. Additionally or alternatively, each of the light sources 46a-j may be activated and deactivated in turn to produce the impression of a moving light across the exposed portion 42. Additionally or alternatively still, a portion of the light sources 46a-j may be configured to emit light at a first wavelength and another portion of the light sources 46a-j may be configured to emit light at a second wavelength that is different than the first wavelength. In this manner, the exposed portion 42 or sections thereof may be configured to luminesce in a first color when only the first portion of the light sources 46a-j are activated and a second color when only the second portion of the light sources 46a-j are activated. When both the first and second portions of the light sources 46a-j are activated together, the exposed portion 42 luminesces in a third color that is made up of a light mixture of the first and second colors. Since the current draw to the light sources 46a-j is typically low, the light sources 46a-j may be activated or remain activated to produce luminescent lighting even when the vehicle 22 is turned OFF. The light sources 46a-j may be deactivated once a certain time period has lapsed or may shut off automatically if the vehicle power supply becomes low.

Accordingly, a molding has been advantageously provided herein. The molding retains its protective properties while providing luminescent light having both functional and decorative characteristics.

For the purposes of describing and defining the present teachings, it is noted that the terms "substantially" and "approximately" are utilized herein to represent the inherent degree of uncertainty that may be attributed to any quantitative comparison, value, measurement, or other representation. The term "substantially" and "approximately" are also utilized herein to represent the degree by which a quantitative representation may vary from a stated reference without resulting in a change in the basic function of the subject matter at issue. It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A lighting system of a vehicle, comprising:
a body panel having a concealed portion disposed at a beltline of the vehicle;
a cover panel coupled to the concealed portion of the body panel of a vehicle;
a carrier disposed between the cover panel and the body panel, the carrier having an exposed portion configured to luminesce in response to light excitation; and
at least one light source for exciting the exposed portion.

2. The lighting system of claim 1, wherein the carrier is arranged as an optical waveguide.

3. The lighting system of claim 1, wherein the at least one light source is disposed on a flex circuit snapably engaged to the carrier.

4. The lighting system of claim 1, wherein the belt line is defined as a line just below a number of windows of the vehicle.

5. The lighting system of claim 1, wherein the at least one light source is operable to emit light intermittently such that the exposed portion luminesces in a blinking pattern.

6. The lighting system of claim 1, wherein the at least one light source is operable to emit light at varying intensity such that the exposed portion luminesces at a first brightness to indicate a first vehicle condition and a second brightness to indicate a second vehicle condition.

7. The lighting system of claim 1, comprising a plurality of light sources disposed inside the carrier, wherein the exposed portion is configured to luminesce in a first color when a first portion of the plurality of light sources are activated and a second color when a second portion of the plurality of light sources are activated.

8. The lighting system of claim 1, wherein the body panel comprises one of a side panel and a rear panel including a trunk panel.

9. A lighting system of a vehicle comprising:
a body panel having a concealed portion disposed at a beltline of the vehicle
a cover panel coupled to the concealed portion and having an upper portion extending over and beyond the body panel;
a carrier disposed between the upper portion and the body panel and having an exposed portion that luminesces in response to light excitation; and
at least one light source for exciting the exposed portion.

10. The lighting system of claim 9, wherein the carrier is arranged as an optical waveguide.

11. The lighting system of claim 9, wherein the belt line is defined as a line just below a number of windows of the vehicle.

12. The lighting system of claim 9, wherein the at least one light source is operable to emit light intermittently such that the exposed portion luminesces in a blinking pattern.

13. The lighting system of claim 9, wherein the at least one light source is operable to emit light at varying intensity such that the exposed portion luminesces at a first brightness to indicate a first vehicle condition and a second brightness to indicate a second vehicle condition.

14. The lighting system of claim 9, comprising a plurality of light sources disposed inside the carrier, wherein the exposed portion is configured to luminesce in a first color when a first portion of the plurality of light sources are activated and a second color when a second portion of the plurality of light sources are activated.

15. A lighting system of a vehicle comprising:
a body panel having a concealed portion disposed at a beltline of the vehicle;
a cover panel having a first portion coupled to the concealed portion and a second portion extending freely;
a carrier disposed between the second portion and the body panel, and having an exposed portion configured to luminesce in response to light excitation; and
at least one light source for exciting the exposed portion.

16. The lighting system of claim 15, wherein the at least one light source is configured to emit blue light.

17. The lighting system of claim 15, wherein the beltline is defined as a line just below a number of windows of the vehicle the number of windows comprising at least one of a side window and a rear window.

18. The lighting system of claim 15, wherein the at least one light source is operable to emit light intermittently such that the exposed portion luminesces in a blinking pattern.

19. The lighting system of claim 15, wherein the at least one light source is operable to emit light at varying intensity such that the exposed portion luminesces at a first brightness to indicate a first vehicle condition and a second brightness to indicate a second vehicle condition.

20. The lighting system of claim 15, comprising a plurality of light sources disposed inside the carrier, wherein the exposed portion is configured to luminesce in a first color when a first portion of the plurality of light sources are activated and a second color when a second portion of the plurality of light sources are activated.

* * * * *